United States Patent
Atarashi et al.

(10) Patent No.: US 6,863,979 B2
(45) Date of Patent: Mar. 8, 2005

(54) CONSOLIDATED MATERIAL OF COATED POWDERS AND PROCESS FOR PRODUCING SAME

(75) Inventors: Takafumi Atarashi, Tokyo (JP); Katsuto Nakatsuka, 3-5-1403, Moniwadai 4-chome, Taihaku-ku, Sendai-shi, Miyagi (JP)

(73) Assignees: Nittetsu Mining Co., Ltd., Tokyo (JP); Katsuto Nakatsuka, Miyagi (JP)

( * ) Notice: Subject to any disclaimer, the term of this patent is extended or adjusted under 35 U.S.C. 154(b) by 0 days.

(21) Appl. No.: 09/254,005

(22) PCT Filed: Aug. 20, 1997

(86) PCT No.: PCT/JP97/02895

§ 371 (c)(1),
(2), (4) Date: Mar. 1, 1999

(87) PCT Pub. No.: WO98/08638

PCT Pub. Date: Mar. 5, 1998

(65) Prior Publication Data

US 2003/0129388 A1 Jul. 10, 2003

(30) Foreign Application Priority Data

Aug. 29, 1996 (JP) .......................... P. 8-228713

(51) Int. Cl.$^7$ .............................. B32B 9/00
(52) U.S. Cl. ................ 428/404; 428/403; 428/389
(58) Field of Search ................ 428/357, 375, 428/378, 379, 380, 381, 384, 389, 401, 402, 403, 404, 406, 546, 570; 427/189, 190–192, 202, 203, 205, 163.1, 113.4; 264/113, 434

(56) References Cited

U.S. PATENT DOCUMENTS

| | | | |
|---|---|---|---|
| 2,646,456 A | * 7/1953 | Jacquier ..................... 136/28 |
| 3,557,751 A | * 1/1971 | Kushima .................... 118/637 |
| 3,654,902 A | * 4/1972 | Hakanson ................... 118/637 |
| 3,718,608 A | * 2/1973 | Mason et al. ................ 252/514 |
| 3,769,770 A | * 11/1973 | Deschamps et al. ....... 52/404.1 |
| 3,838,982 A | * 10/1974 | Sanderow et al. ......... 29/182.5 |
| 3,864,345 A | * 2/1975 | Mason et al. ................ 252/514 |
| 3,909,258 A | * 9/1975 | Kotz ........................... 96/1 R |
| 3,941,469 A | * 3/1976 | Okamoto ................. 355/3 DD |
| 4,042,590 A | * 8/1977 | Jacquier ..................... 428/570 |
| 4,076,955 A | * 2/1978 | Gates, Jr. ................... 174/52.4 |
| 4,711,814 A | 12/1987 | Teichmann |
| 4,859,364 A | * 8/1989 | Yamamoto et al. ......... 252/512 |
| 4,873,148 A | * 10/1989 | Kemp, Jr. et al. .......... 428/570 |
| 5,030,301 A | * 7/1991 | Stout et al. .................... 149/5 |
| 5,126,915 A | * 6/1992 | Pepin et al. ................ 361/304 |
| 5,196,232 A | * 3/1993 | Kitazaki et al. ............ 427/180 |
| 5,348,800 A | 9/1994 | Moro et al. |
| 5,453,293 A | * 9/1995 | Beane et al. .................. 427/96 |
| 5,573,602 A | * 11/1996 | Banerji et al. ................ 148/24 |
| 5,716,552 A | * 2/1998 | Paszkiet et al. ............. 252/514 |
| 5,763,085 A | * 6/1998 | Atarashi et al. ............ 428/403 |
| 5,965,194 A | * 10/1999 | Truong et al. .............. 427/127 |
| 5,985,466 A | * 11/1999 | Atarashi et al. ............ 428/570 |
| 6,162,532 A | * 12/2000 | Black et al. ................. 428/323 |

FOREIGN PATENT DOCUMENTS

| | | | |
|---|---|---|---|
| JP | 47-34572 | 8/1972 | |
| JP | 48-15123 | 2/1973 | |
| JP | 63-286537 | 11/1988 | ............. C22C/1/05 |
| JP | 3-205364 | 9/1991 | ........... C04B/35/58 |
| JP | 4-21739 | 1/1992 | ........... C22C/32/00 |
| JP | 4-202645 | 7/1992 | ........... C22C/38/00 |
| JP | 5-504122 | 7/1993 | ........... C04B/35/00 |
| JP | 6-228604 | 8/1994 | ............. B22F/1/02 |
| JP | 6-283369 | 10/1994 | ............. H01G/4/12 |
| JP | 6-306405 | 11/1994 | ............. B22F/1/02 |
| JP | 7-90310 | 4/1995 | ............. B22F/1/02 |

OTHER PUBLICATIONS

European Search Report for EP 97 93 5840 dated Feb. 24, 2004.

* cited by examiner

*Primary Examiner*—Paul Thibodeau
*Assistant Examiner*—Kevin R. Kruer
(74) *Attorney, Agent, or Firm*—Sughrue Mion, PLLC

(57) ABSTRACT

A consolidated material of coated powders obtained by a method which comprises forming a molding by mutually bonding powder particles having a given property and in which the powder particles can be made to have a desired arrangement or can be arranged in positions giving such a predetermined distance that desired properties are obtainable. The present invention shows a process for producing a consolidated material of coated powders which are mutually consolidated, comprising adhering either powders each comprising a base particle having thereon a coating film having a uniform thickness of 0.01 to 20 $\mu$m or powders each comprising base particles each having thereon plural coating films having a uniform thickness of 0.01 to 5 $\mu$m per film in which at least any adjacent coating films are different in kind, at the coating film or by an adhesive.

2 Claims, No Drawings

CONSOLIDATED MATERIAL OF COATED POWDERS AND PROCESS FOR PRODUCING SAME

The present application is a National Stage (371) of PCT International Application PCT/JP97/02895, filed on Aug. 20, 1997, and claims priority to Japanese Application No. 08-228713, filed on Aug. 29, 1996.

TECHNICAL FIELD

The present invention relates to a consolidated material of coated powders obtained by consolidating either a powder comprising base particles having on the surface thereof a coating film of an even thickness of 0.01 to 20 μm or a powder having two or more similar coating films, and also to a process for producing the coherent mass. Namely, this invention relates to products of especially nonlinear materials, for example, magnetic materials, such as magnetic heads and magnetic recording materials, electrical parts, glass/ceramic materials, and the like, and a process for producing these.

BACKGROUND ART

A technique is known which comprises coating the surface of a powder with another substance to improve the properties of the powder or impart a variety of properties thereto. Various means have conventionally been proposed therefor.

Among powders, metal powders and the like are frequently used because they have various applications. With respect to methods for forming a coating film of a metal on the surface of a metal powder or metal oxide powder, JP-A-3-271376, for example, proposes a method in which a coating film of cobalt metal is formed on the surface of a powder of either a metal such as cobalt metal, nickel metal, or iron metal or a metal oxide such as a ferrite or chromium oxide by reducing a water-soluble cobalt salt by a wet process. However, it has conventionally been impossible to industrially coat the surface of a powder of a metal or metal oxide with a thick and even film of a different kind of metal oxide.

The present inventors previously invented a method for forming a film of a metal oxide by dispersing a metal powder or a metal oxide powder into a metal alkoxide solution and hydrolyzing the metal alkoxide, and filed a patent application (JP-A-6-228604).

The present inventors further developed highly functional powders by alternately forming metal films and metal oxide films on the surface of a metal powder or a metal oxide powder, and filed a patent application (JP-A-7-90310). For example, the inventors succeeded in obtaining a magnetic powder of a sufficiently white color by forming a coating film of a metal oxide on the surface of a powder of a magnetic material such as a ferrite or chromium oxide and forming a coating film of cobalt metal or silver metal thereon, and also in obtaining an insulating powder having satisfactory thermal conductivity by forming a metal oxide film on base particles of a metal having satisfactory thermal conductivity, such as silver metal or copper metal. Furthermore, the present inventors made an application for patent concerning a process which comprises similarly forming a multilayered metal oxide film on the surface of metal or metal compound base particles and subjecting the particles coated with the multilayered metal oxide film to a heat treatment to produce a powder having a denser and stabler, multilayered metal oxide film (JP-A-7-80832).

As described above, the present inventors has made efforts with a view to developing a highly functional metal or metal compound powder by forming one or more films of a metal or metal oxide on the surface of a metal powder or metal compound powder (base particles) to impart a property other than those possessed by the metal or metal compound base particles serving as cores.

It is however desired to provide a more highly functional metal or metal compound powder at low cost and to provide a technique which is applicable also to a wide variety of powders made of materials other than metals or metal compounds, for example, organic powders, and is capable of forming two or more metal or metal oxide films on organic base particles, and the like.

On the other hand, many products especially of nonlinear materials, for example, magnetic materials, such as magnetic heads, magnetic recording materials, and the like, electrical parts, such as boundary layer type capacitors and the like, and glass/ceramic materials, such as high-toughness glass materials, deflecting filters, and the like, are produced from powders or sheets or the like by a method comprising consolidating and molding a powder or by a method comprising superposing sheets and consolidating and molding the same.

Such methods for producing those products include a technique in which an impurity is added to a starting powder and a heat treatment for consolidation is conducted to separate out the added impurity at the boundary between the starting powder and a consolidating material (a medium or the like) to impart nonlinear properties to the consolidated material or utilize the separated substance as a medium for mutually consolidating the powder particles. An example of this technique is a varistor boundary capacitor produced by a method in which a powder of a ferroelectric material such as barium titanate is consolidated and inserted between electrodes made of a metallic conductor, during which operation an insulating impurity is separated from the ferroelectric powder to improve insulating properties.

In glass materials and optical materials, e.g., in MgO—$Al_2O_3$—$SiO_2$ glasses, there is a technique in which $TiO_2$ is added to and dispersed into a molten glass prior to molding and the melt is caused to undergo crystallization using the $TiO_2$ as nuclei to give a high-toughness glass material. Another technique comprises dispersing silver into an optical glass to bring the silver into a colloidal state and crystallizing the glass using the colloidal silver as nuclei to give a nonlinear optical material.

Examples of the products produced by superposing sheets and consolidating and molding the same include a magnetic head for recording and reproducing which is produced by superposing sheets of a Permalloy alloy and consolidating the sheets with an adhesive. With respect to other magnetic materials, a material obtained by consolidating a polycrystalline ferrite with an insulator is used as a digital head for audio or computer tapes, while a Sendust alloy is used for tapes having a high coercive force.

In the production of magnetic heads and magnetic cores among the aforementioned magnetic materials and the like, a magnetic material having a predetermined particle diameter is consolidated so as to obtain a maximum energy product to improve magnetic properties. However, it is difficult to conduct consolidation without changing the particle diameter, and the magnetic material unavoidably undergoes an increase in particle diameter as a result of crystal growth therein.

Furthermore, in producing the above-described high-toughness glass material, for example, it is almost impossible to evenly disperse the additive added to a molten glass, which has a high viscosity.

As described above, the production of distinctive products having an added high value, for example, products exhibiting nonlinear properties, necessitates a high level of techniques such as a technique for arranging sheets or acicular base particles serving as cores at the same distance so as to orient in a given direction and consolidating the same while maintaining this state, a technique for bonding the arranged particles by means of films present among the particles, and a technique for evenly mixing particles with a high-viscosity fluid to obtain a homogeneous dispersion. Those products are frequently difficult to produce with conventionally known techniques alone.

An object of the present invention is to eliminate such problems and provide techniques with which distinctive products having an added high value can be stably produced at low cost.

Specifically, the object is to provide, for example, a technique in which magnetic particles having such a particle diameter as to give a maximum energy product are evenly consolidated without causing crystal growth, for example, in order to improve the magnetic properties of magnetic heads and a technique in which high-capacity capacitors on a more constant quality level which are similar in constitution to BL capacitors are produced by employing a conductor as core particles (referred to as base particles), forming a ferroelectric-material layer having an even thickness over the particles, and forming a conductor layer thereon.

DISCLOSURE OF THE INVENTION

The present inventors directed attention to a point that the problems described above might be eliminated by using the above-described techniques concerning a powder having a coating film(s), and made investigations. As a result, the present invention has been achieved.

Namely, the present invention has succeeded in eliminating the above-described problems by the following means.

(1) A consolidated material of coated powders each comprising a base particle having thereon a coating film having a uniform thickness of 0.01 to 20 $\mu$m, wherein the coated powders are mutually adhered at the coating film or by an adhesive.

(2) The consolidated material of coated powders according to the above (1), wherein in the coated powders each comprising a base particle each having thereon a coating film having a uniform thickness of 0.01 to 20 $\mu$m, the base particle comprises a glass, a metal, or a metal oxide, and the coating film is a metal film or a metal oxide film.

(3) A coherent coated-powder of coated powders each comprising a base particle having thereon plural coating films having a uniform thickness of 0.01 to 5 $\mu$m per film in which at least any adjacent coating films are different in kind, wherein the coated powders are mutually adhered at the outermost coating film or by an adhesive.

(4) The consolidated material of coated powders according to the above (3), wherein in the coated powders each comprising a base particle having thereon plural coating films having a uniform thickness of 0.01 to 5 $\mu$m per film in which at least any adjacent coating films are different in kind, wherein the base particle comprises a glass, a metal, or a metal oxide, and the coating films are each a metal film or a metal oxide film.

(5) The consolidated material of coated powders according to any one of the above (1) to (4), wherein the base particle comprises a magnetic material.

(6) The consolidated material of coated powders according to the above (5), wherein at least one of the coating films comprises a dielectric material.

(7) A process for producing a consolidated material of coated powders which are mutually consolidated, comprising adhering either powders each comprising a base particle having thereon a coating film having a uniform thickness of 0.01 to 20 $\mu$m or powders each comprising a base particle having thereon plural coating films having a uniform thickness of 0.01 to 5 $\mu$m per film in which at least any adjacent coating films are different in kind, at the coating film.

(8) A process for producing a consolidated material of coated powders which are mutually consolidated, comprising adhering either powders each comprising a base particle having thereon a coating film having a uniform thickness of 0.01 to 20 $\mu$m or powders each comprising a base particle having thereon plural coating films having a uniform thickness of 0.01 to 5 $\mu$m per film in which at least any adjacent coating films are different in kind, by an adhesive.

The base particles serving as the cores of a powder for the consolidated material of coated powders of the present invention are not particularly limited in the material, particle diameter, and shape thereof. The material thereof may be any of organic substances and inorganic substances, and the particle diameter thereof is not particularly limited as long as it is not larger than 6 mm in terms of average particle diameter. Furthermore, the shape thereof may be spherical or ellipsoidal or may be a shape such as those represented by a star shape. In some cases, the base particles may be porous particles.

Base particles preferably used in the present invention are as follows. The material thereof is preferably an organic polymeric compound, silicone resin, glass, metal, or metal oxide, especially preferably a glass, metal, or metal oxide. The particle diameter thereof is 100 $\mu$m or smaller in terms of average particle diameter. Furthermore, the shape thereof is nearly spherical or ellipsoidal, and the surface thereof is preferably smooth because an even coating film is easy to obtain.

Various techniques are usable in the present invention for coating the surface of the base particles made of, e.g., an organic polymeric compound, silicone resin, glass, metal, or metal oxide. For example, a preferred technique comprises dispersing the base particles into a dehydrated alcohol, adding thereto, with sufficient stirring, a solution of an alkoxide of the metal corresponding to the metal oxide to be formed as a coating film on the particle surface, gradually adding an alcohol/water mixture to the above homogeneous mixture to hydrolyze the alkoxide to form a layer of a sol of the metal oxide on the surface of the base particles being treated, and converting the sol into a gel. In the case of single-layer coating, a coated powder is obtained by drying the alkoxide gel deposited on the surface of the base particles being treated. Preferably used as a means for this drying is vacuum drying.

In producing a coated powder having a multilayered coating film, the desired coated powder is obtained by dispersing the powder coated with the gel obtained from a metal alkoxide into a dehydrated alcohol, repeating the above-described procedure in which an alkoxide of the metal with which surface treatment is conducted is added with sufficient stirring and an alcohol/water mixture is gradually added to the homogeneous mixture to hydrolyze the alkoxide, and drying the powder after the base particles have been thus coated with a desired number of metal oxide gel layers.

Powders, such as an iron metal powder, nickel metal powder, aluminum metal powder, polystyrene beads, polymethacrylate beads, starch beads, acetyl cellulose beads, and the like, suffer a surface denaturation in aqueous solutions of strong acids even when their concentrations are low, and this surface denaturation may influence the quality of final products, for example, by causing devitrification. Consequently, in the case of using such a substance as cores of a powder, it is undesirable to use a meal salt, such as titanium sulfate, titanium chloride, aluminum sulfate, or the like, as a starting material for forming a coating film on the surface of the powder.

However, even when base particles whose surface is apt to be attacked are used as cores, formation of a chemical-resistant coating film beforehand on the surface of the base particles enables a corrosive metal salt, such as titanium sulfate, titanium chloride, aluminum sulfate, or the like, to be used as a starting material for coating the surface of the core substance. Thus, the range of means for surface coating can be widened.

One method usable for depositing a metal oxide film on the surface of a core substance in the present invention is described in JP-A-6-228604 and JP-A-7-90310. In the case where this method is used for depositing a metal hydroxide film or metal oxide film on base particles, the coating film can be formed on the surface of the base particles without the fear of denaturing the surface of the particles. This method, which is called a sol-gel method, is capable of forming an oxide having a fine and homogeneous composition. By applying this method to powders, an even, thick, and dense film is obtained. A metal alkoxide is selected which is an alkoxide of the metal corresponding to the desired metal oxide, such as zinc, aluminum, cadmium, titanium, zirconium, tantalum, silicon, or the like.

Another method for depositing a metal oxide film on the surface of a core substance (base particles) in the present invention is a method in which a metal hydroxide film or a metal oxide film is deposited on the surface of the base particles. For example, this method uses a metal salt, such as titanium sulfate, aluminum sulfate, or the like, as a starting material, and comprises immersing a core substance in an aqueous solution of the metal salt and neutralizing the system with an aqueous solution of a caustic alkali, ammonia, urea, or the like to deposit the resultant metal hydroxide or metal oxide on the base particles. In using this method, care should be taken because there are cases where the surface of the base particles is denatured depending on methods for neutralization and heating.

However, since the above method enables a metal salt to be used as a starting material to coat the surface of particles, it is a simple method for depositing a metal hydroxide film or metal oxide film and is considerably inexpensive. Thus, there is a wide selection of production means.

Examples of the metal salt include acid salts of metals.

Examples of the metals usable as metal salts in the present invention include iron, nickel, chromium, titanium, zinc, aluminum, cadmium, zirconium, and silicon, and further include calcium, magnesium, and barium. Examples of salts of these metals include salts of sulfuric acid, nitric acid, hydrochloric acid, oxalic acid, carbonic acid, and carboxylic acids. Chelate complexes of the above metals are also included. A suitable kind of metal salt for use in the present invention is selected according to the property to be imparted to the surface of the powder and the means to be used for production.

Besides the above methods, many conventional means can be used for forming a coating film on the surface of a powder, such as coating methods, deposition methods, sputtering, vacuum deposition, electrodeposition, anodization, and the like. A method usable for consolidating a powder on which a coating film has been formed by an above-described method according to the present invention comprises applying an adhesive to the surface of the powder, molding the powder, and subjecting the molding to pressing and a heat treatment.

Examples of the adhesive used for molding the powder having a coating film into a product include organic polymer adhesives based on vinyl polymers, rubbers, condensation resins, and the like, and inorganic polymer adhesives based on glasses, ceramics, and the like. The organic polymer adhesives can be used not only as solution type organic polymer adhesives which are solutions in water or organic solvents, but also as condensation type organic polymer adhesives such as epoxy adhesives and phenol-formaldehyde adhesives. The inorganic polymer adhesives such as glass- or ceramic-based ones can be used in the form of a powder in such a manner that the adhesive powder is evenly mixed with a powder according to the present invention and the powder mixture is molded by a heat treatment, e.g., HIP, to obtain a calcined material.

In the present invention, the base particles serving as the cores of the multilayer-coated powder according to the present invention may be particles made of an organic substance besides particles made of an inorganic substance. Examples of the inorganic substance constituting the inorganic base particles according to the present invention include metals, such as iron, nickel, chromium, titanium, aluminum, and the like; metal alloys, such as iron-nickel, iron-cobalt alloys, and the like; iron-nickel alloy nitrides; iron-nickel-cobalt alloy nitrides; metal oxides, such as oxides of iron, nickel, chromium, titanium, aluminum, silicon, calcium, magnesium, barium, and the like, and composite oxides of these metals; clays; and glasses.

An especially preferably used as the substance constituting the base particles is a magnetic metal, such as iron, nickel, or the like, or a magnetic metal alloy, such as an iron-nickel alloy, an iron-cobalt alloy, or the like, or is a magnetic metal oxide, such as iron oxide, chromium oxide, or the like.

When substances having various electrical properties, such as barium ferrite, Mn—Zn ferrite, Ni—Zn ferrite, Cu—Zn ferrite, Permalloy, Sendust, Permendur, Alperm, magnetic Sm—Co—Fe alloys and nitrides thereof, magnetic Nd—B alloys, and the like, are used as that substance, then coherent masses having properties attributable to these substances are obtained therefrom.

When glasses or ceramics are used as that substance, then coherent masses which effectively take advantage of powders of these are obtained.

In the present invention, the base particles according to this invention can be ones made of an organic substance. Examples of the organic substance constituting the organic base particles according to the present invention include natural and synthetic polymeric compounds. Examples of the synthetic polymeric compounds include polystyrene, polyethylene, polypropylene, polyacrylates, polymethacrylates, and copolymers of any of the monomers constituting these polymers with other monomer(s). Examples of the natural polymeric compounds include starch, agarose, cellulose, and gelatin. Also usable besides these are semisynthetic polymeric compounds, such as acetyl cellulose, hydroxyethyl cellulose, and the like. Although the base particles made of such organic polymeric compounds may be particles of irregular shapes, they are preferably spherical particles formed by the suspension polymerization method or seed polymerization method or formed by the solution dispersion method or the like.

By any of the above-described methods according to the present invention, a metal hydroxide film, metal oxide film, ferroelectric film, adhesive film, etc. are deposited on the surface of base particles in given thicknesses, whereby given properties are imparted to the particles and a powder having a single-layer coating film or a composite coating film is obtained. This powder is molded into a coherent molding by bonding the powder particles to each other by means of the coating film itself present thereon. Alternatively, the powder particles having a single-layer coating film or having a composite coating film are arranged at the same distance in a given direction and subjected to any of the operations described below using any of the aforementioned adhesives, such as resins and the like, while maintaining that state to give a consolidated molding. It is also possible to mold the powder as a calcined material through a heat treatment under pressure, such as HIP or the like. Thus, a new effect can be imparted to the powder having a coating film.

In particular, the present invention produces excellent effects because the consolidated molding can be composed of two or more components in which the coating film has characteristic properties and is regulated so as to have a constant level of quality, and because the powder particles having the coating film can be arranged at the same distance in a given direction and united into a consolidated molding while maintaining that state.

Specific embodiments of the present invention will be enumerated below to further explain the invention.

(1) An example in which a product having a high added value is obtained by regulating the thickness of a coating film and arranging the particles at the same distance.

Mn—Zn ferrite having a particle diameter of 0.3 $\mu$m is used as base particles serving as cores. A silica layer having a thickness of 0.01 $\mu$m is formed as a coating film on the surface of the base particles. The Mn—Zn ferrite powder having this silica coating film serving as an insulating film is packed, for example, into a mold to orient the particles in a given direction. The powder in the mold is consolidated with an epoxy adhesive while maintaining that state, whereby a magnetic head for recording/reproducing can be produced which has an extremely low eddy-current loss at high frequencies.

(2) A ferroelectric film having an exactly even thickness is interposed between base particles of a conductor and a coating film of a conductor to form composite particles according to the present invention. The composite particles are molded and consolidated with an insulating coating material while keeping the outermost conductive coating films of the individual particles in a mutually electrically connected state so that the particles can have the same potential. Thus, a high-capacity capacitor (BL capacitor) can be produced.

(3) The surface of base particles made of a semiconductor, such as cadmium sulfide (CdS) or the like, or a conductor, such as gold, silver, or the like, is coated with borosilicate glass to form a coating film. This coated powder is consolidated by calcining, whereby a glass having optical anisotropy can be produced.

(4) Even when a film made of an organic polymer is deposited as a coating film on particles, a consolidated molding product having a high added value can be produced with the techniques according to the present invention.

BEST MODES FOR CARRYING OUT THE INVENTION

Methods for producing high-capacity capacitors by the consolidation/molding of the above-described particulate capacitors and others will be described as Examples so that the present invention can be more clearly understood. However, the present invention should not be construed as being limited by the following Examples.

EXAMPLE 1

BL Capacitor

Into a solution prepared beforehand by mixing 2,000 g of ethanol with 80 g of zinc ethoxide were dispersed 100 g of barium titanate particles having an average particle diameter of 5 $\mu$m. Thereafter, 400 g of ethanol and 80 g of deionized water both prepared beforehand were added dropwise to the dispersion over 1 hour to deposit zinc oxide and thereby form a zinc oxide coating film. The zinc oxide film obtained had a thickness of 0.2 $\mu$m. The barium titanate powder having the zinc oxide coating film formed thereon was separated from the liquid and dried.

This powder was calcined in air at 1,200° C. for 3 hours by the HIP method to obtain a calcined material.

The capacitance of this calcined material was measured. As a result, the $E_{1KHz}$ was found to be 11,000.

COMPARATIVE EXAMPLE 1

BL Capacitor

A hundred grams of the same barium titanate particles as those used in the Example (average particle diameter, 5 $\mu$m) were calcined, without any pretreatment, in air at 1,200° C. for 3 hours by the HIP method to obtain a calcined material.

The capacitance of this calcined material was measured. As a result, the $E_{1KHz}$ was found to be 1,800.

Relative permittivity can be heightened, when barium titanate particles are calcined while isolating the particle boundaries from one another by means of an oxide film having high electrical resistance formed beforehand on the particles as in Example 1, in contrast to Comparative Example 1.

EXAMPLE 2

High-permittivity Capacitor
First layer, barium titanate layer

To a solution prepared beforehand by mixing 2,000 g of ethanol with 86 g of barium isopropoxide and 70 g of titanium ethoxide were added 100 g of particulate silver metal particles having an average particle diameter of 5 $\mu$m. While this solution was held at 55° C., a solution prepared by mixing 140 g of deionized water with 400 g of ethanol was added dropwise thereto over 1 hour. After the addition, the resultant mixture was reacted for 6 hours.

After the reaction, the particles were heated in a nitrogen gas atmosphere at 650° C. for 3 hours to obtain barium titanate-coated silver powder $B_1$.
Second layer, silver layer:

Into 1,200 ml of a silver solution prepared beforehand was dispersed 100 g of the barium titanate-coated silver powder $B_1$ obtained above. Thereto was added, with stirring, 1,200 ml of a reducing solution prepared beforehand. Silver metal was deposited through reduction for 1 hour to obtain silver-coated, barium titanate-coated silver powder $B_2$.

The silver solution used above was a liquid obtained by dissolving 3.5 g of silver nitrate in 60 g of deionized water, adding 4 g of ammonia water (29%) to the solution, adding thereto an aqueous solution prepared by dissolving sodium hydroxide in 60 g of water, subsequently adding 5 g of ammonia water (29%) again, and then sufficiently stirring the resultant mixture.

The reducing solution was a solution obtained by dissolving glucose and tartaric acid in 1 liter of water, boiling the resultant solution, cooling the same, and then adding 79.3 g of ethanol.

Third Layer, Barium Titanate Layer:

To a solution prepared beforehand by mixing 2,000 g of ethanol with 86 g of barium isopropoxide and 70 g of titanium ethoxide was added 100 g of the silver-coated, barium titanate-coated silver powder $B_2$ obtained above. While this solution was held at 55° C., a solution prepared by mixing 140 g of deionized water with 400 g of ethanol was added dropwise thereto over 1 hour. After the addition, the resultant mixture was reacted for 6 hours.

After the reaction, the particles were heated in a nitrogen gas atmosphere at 650° C. for 3 hours to obtain barium titanate-coated, silver-coated silver powder $B_3$.

Fourth layer, silver layer:

Into 1,200 ml of a silver solution prepared beforehand was dispersed 100 g of the silver-coated, barium titanate-coated silver powder $B_3$ obtained above. Thereto was added, with stirring, 1,200 ml of a reducing solution prepared beforehand. Silver metal was deposited through reduction for 1 hour to obtain silver-coated, barium titanate-coated silver powder $B_4$.

Fifth layer, barium titanate layer:

To a solution prepared beforehand by mixing 2,000 g of ethanol with 86 g of barium isopropoxide and 70 g of titanium ethoxide was added 100 g of the silver-coated, barium titanate-coated silver powder $B_4$ obtained above. While this solution was held at 55° C., a solution prepared by mixing 140 g of deionized water with 400 g of ethanol was added dropwise thereto over 1 hour. After the addition, the resultant mixture was reacted for 6 hours.

After the reaction, the particles were heated in a nitrogen gas atmosphere at 650° C. for 3 hours to obtain barium titanate-coated, silver-coated silver powder $B_5$.

Property Test:

The powders in some of the various stages of coating film formation were examined for properties to determine property differences among these.

Each of the barium titanate-coated silver powder $B_1$, the silver-coated, barium titanate-coated silver powder $B_3$, and the silver-coated, barium titanate-coated silver powder $B_5$ was calcined in air at 1,200° C. for 3 hours by the HIP method to obtain calcined materials.

The capacitances $E_{1KHz}$ of the calcined materials obtained are shown in Table 1.

As Table 1 shows, when silver, which is a conductor, was used as base particles and barium titanate was used as a dielectric, then the capacitance increased as the number of silver films increased.

TABLE 1

Relationship between the number of films and relative permittivity in calcined materials of film-coated powders

| Kind of coating film | Layer constitution of coating film | Capacitance $E_{1KHz}$ |
|---|---|---|
| $B_1$ | Silver powder with one barium titanate film | 1,100 |
| $B_3$ | Silver powder with two barium titanate films and one silver film | 5,600 |
| $B_5$ | Silver powder with three barium titanate films and two silver films | 17,100 |

EXAMPLE 3

High-toughness Material

Into isopropanol were dispersed 100 g of titanium metal base particles (average particle diameter, 3 μm). Thereto was added 50 g of aluminum isopropoxide, followed by a solution prepared by mixing 20 g of ammonia water with 30 g of water. The resultant mixture was reacted for 5 hours. After the reaction, the particles were washed with a sufficient amount of ethanol. After solid/liquid separation, the particles recovered were dried with a vacuum dryer at 90° C. for 8 hours to obtain alumina-coated titanium powder 3A.

The alumina-coated titanium powder 3A obtained was coated again using a solution having the same composition, and then dried. The dried powder was heated with a rotary tubular oven in a nitrogen gas atmosphere at 650° C. for 2 hours to obtain alumina-coated titanium powder 3B. The powder obtained had an average particle diameter of 5 μm.

Into isopropanol were dispersed 100 g of zirconia base particles (average particle diameter, 3 μm). Thereto was added 55 g of aluminum isopropoxide, followed by a solution prepared by mixing 20 g of ammonia water with 35 g of water. The resultant mixture was reacted for 5 hours. After the reaction, the particles were washed with a sufficient amount of ethanol. After solid/liquid separation, the particles recovered were dried with a vacuum dryer at 90° C. for 8 hours to obtain alumina-coated zirconia base particles 3C.

The alumina-coated zirconia powder 3C obtained was coated again using a solution having the same composition, and then dried. The dried powder was heated with a rotary tubular oven in a nitrogen gas atmosphere at 650° C. for 2 hours to obtain alumina-coated zirconia powder 3D. The powder obtained had an average particle diameter of 5 μm.

Three powders consisting of the powders 3B and 3D obtained and an alumina powder (average particle diameter, 5 μm) were mixed with each other and homogenized by means of a V-shaped blender. The homogeneous powder was calcined at 1,350° C. for 8 hours by the HIP method to obtain a calcined material. The calcined material obtained had a fracture toughness of 9.9 $(MN \cdot m^{-3/2})$.

COMPARATIVE EXAMPLE 2

The alumina base particles used in Example 3 (average particle diameter, 5 μm) were calcined at 1,350° C. for 8 hours by the HIP method. The calcined material obtained had a fracture toughness of 4.4 $(MN \cdot m^{-3/2})$, which was below a half of the fracture toughness in the case of the calcining of the mixed powder described above.

As demonstrated above, an increased fracture toughness can be obtained by forming a calcined material comprising evenly disposed multiple components.

INDUSTRIAL APPLICABILITY

According to the present invention, a functional coating layer(s) each having a given thickness is deposited on the surface of base particles to impart given properties to the particles and obtain a powder having a single-layer coating film or composite coating film. When this powder is molded by mutually bonding the powder particles by means of the films present among the particles, or when the powder particles having a single-layer coating film or composite coating film are arranged at the same distance in a given direction and consolidated and molded while maintaining that state, then products having a given function as a high added value can be stably produced.

In particular, in the case where base particles made of a magnetic material are used, not only magnetic heads, cores, and like are obtained but also high-capacity capacitors having excellent properties are obtained. In the case of using base particles made of a glass, polarizing filters giving polarized light at specific angles and the like can be obtained by using a material having a specific refractive index to form a coating film having a specific thickness.

What is claimed is:

1. A glass having optical anisotropy comprising coated powders which have been subjected to heat treatment under pressure to consolidate the same, said coated powders each comprising a base particle made of a semiconductor or a conductor having thereon a glass film, wherein the coated powders constituting the consolidated material are three-dimensionally arranged at the same distance from one another in a given direction and are united into said consolidated material while maintaining the same distance in a given direction.

2. A polarizing filter transmitting light having a specific angle comprising coated powders which have been subjected to heat treatment under pressure to consolidate the same, said coated powders each comprising a base particle having thereon a clear multilayer metal oxide film, wherein the coated powders constituting the consolidated material are three-dimensionally arranged at the same distance from one another in a given direction and are united into said consolidated material while maintaining the same distance in a given direction.

* * * * *